Nov. 8, 1932.   C. ZICKMANTEL   1,886,860

SHAVING UTENSIL

Filed June 19, 1928

Inventor:

Patented Nov. 8, 1932

1,886,860

UNITED STATES PATENT OFFICE

CARL ZICKMANTEL, OF BERLIN, GERMANY

SHAVING UTENSIL

Application filed June 19, 1928, Serial No. 286,516, and in Germany July 23, 1927.

This invention relates to shaving utensils and more especially to an improved construction of a shaving-cup. Essentially my invention consists in providing a shaving-cup, which is associated with a soap-container so as to form a unitary shaving utensil. The shaving utensil may be used by wetting a shaving brush and therewith brushing the soap in said container in order to produce the soap-foam necessary for shaving. A further feature of my invention consists in so constructing the shaving utensil that the soap-container which is associated with the shaving-cup may be easily countersunk into the latter for reducing the volume of the utensil, which may be especially desirable for travelling purposes.

Figure 1:
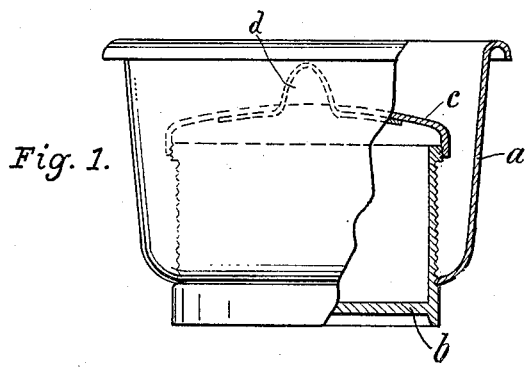
Figure 2:
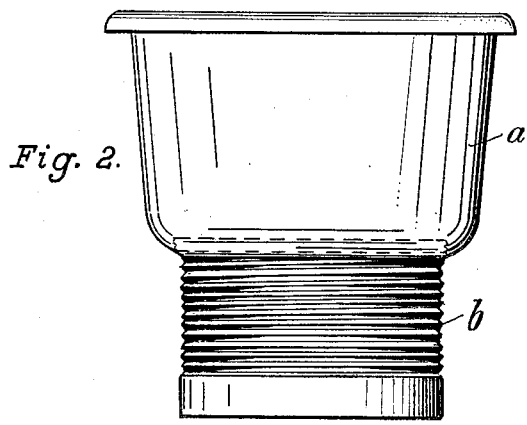
Figure 3:
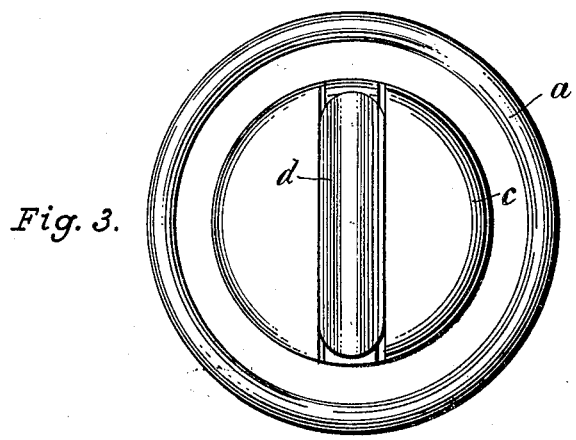

In the drawing which forms part of this specification I have represented exemplifications of a shaving utensil according to my invention, Fig. 1 being a side-view, partly in section, of my new shaving utensil comprising a soap-container which when not in use may be countersunk into the shaving-cup, Fig. 2 a side-view of the utensil shown in Fig. 1 in condition ready for use, and Fig. 3 a top-view taken on Fig. 1.

Referring now more particularly to the drawing, the shaving cup $a$ which may be made of any desired material and shape is structurally united as shown in Figs. 1, 2 and 3 with the soap-container $b$ in such a manner, that the latter will form a continuation of the bottom of the former when in condition ready for use. As may be seen from Figs. 1 and 2, the soap-container $b$ may either be countersunk into the shaving-cup or drawn out of the latter, for instance by the aid of a thread provided in the outer wall of said soap-container and the interior edge of the open bottom of said shaving-cup.

In Fig. 1 I have shown my new shaving utensil in inoperative position, that is with the soap-container countersunk or screwed into the cup, which is especially desirable if the utensil is used for travels or the like. For this purpose the soap-container $b$ is preferably provided with a cover $c$ having a handle $d$, whereby the former may be closed when in its inoperable or collapsed condition.

Fig. 2 shows the new utensil in condition ready for use, the soap-container $b$ in this case being screwed out of the shaving-cup $a$ to such an extent that the upper surface of the former will form the bottom of the latter. If necessary, the upper edge of the soap-container $b$ may be equipped with a flange in order to provide a proper closure for the cup in condition of use.

I desire to be understood that the construction of the shaving utensil according to my invention may be modified as desired without departing from the gist of my invention.

I claim:

1. A telescopic or collapsible shaving utensil comprising a plurality of movable parts, collapsible the one with the other, one of said parts comprising a soap-container and the other comprising a mixing chamber, a threaded flange formed on an external edge of said soap container, and a cover member adapted to thread on said flange.

2. A telescopic or collapsible shaving utensil comprising a plurality of movable parts, collapsible the one into the other, the inner part comprising a soap container, and having a closed bottom, the outer member serving as a mixing chamber, the soap container having peripheral stops adjacent its upper and lower ends, the upper stop being in the form of a threaded flange and also serving as a seal between the parts when in their extended or operable positions, and a cover member adapted to thread on said flange.

3. A telescopic or collapsible shaving utensil comprising a plurality of parts permanently fastened to each other, but adapted for limited movement relative to each other, and collapsible the one into the other, one of said parts comprising a soap container having a threaded upper end, and the other comprising a mixing container, and a cover member adapted to thread on the upper end of said soap container.

4. A telescopic or collapsible shaving utensil comprising a plurality of permanently connected substantially concentric parts having cooperating threads whereby they are collapsible the one into the other to a selected extent, one of said parts comprising a soap container, and the other comprising a mixing chamber.

5. A telescopic or collapsible shaving utensil comprising a plurality of substantially concentric parts, one of said parts being bellied outwardly from the other part and forming a mixing chamber, the lower portion of said mixing chamber terminating in an annular threaded edge, the other of the said parts forming a soap container and having threads on its exterior cooperating with the said first mentioned threads, whereby the parts can be moved relatively to each other, the device being operable for shaving purposes when in its extended position.

6. A telescopic or collapsible shaving utensil comprising a plurality of parts permanently connected to each other, but adapted for limited movement relative to each other, and collapsible the one into the other, one of said parts comprising a soap container, and the other comprising a mixing container, and a cover member adapted to thread on the upper end of said soap container, and means on said soap container for preventing the separation of the parts, and for limiting their relative movement.

7. A telescopic or collapsible shaving utensil comprising a plurality of substantially concentric parts permanently connected, having cooperating threads whereby they are collapsible the one into the other to a selected extent, one of said parts comprising a soap container, and the other comprising a mixing chamber, and means on said soap container for preventing the separation of the parts, and for limiting their relative movement.

In testimony whereof I have signed my name to this specification.

CARL ZICKMANTEL.